H. B. SPERRY.
DISPENSING MECHANISM FOR POTATO PLANTERS.
APPLICATION FILED DEC. 1, 1919.
1,410,843.
Patented Mar. 28, 1922.
3 SHEETS—SHEET 1.
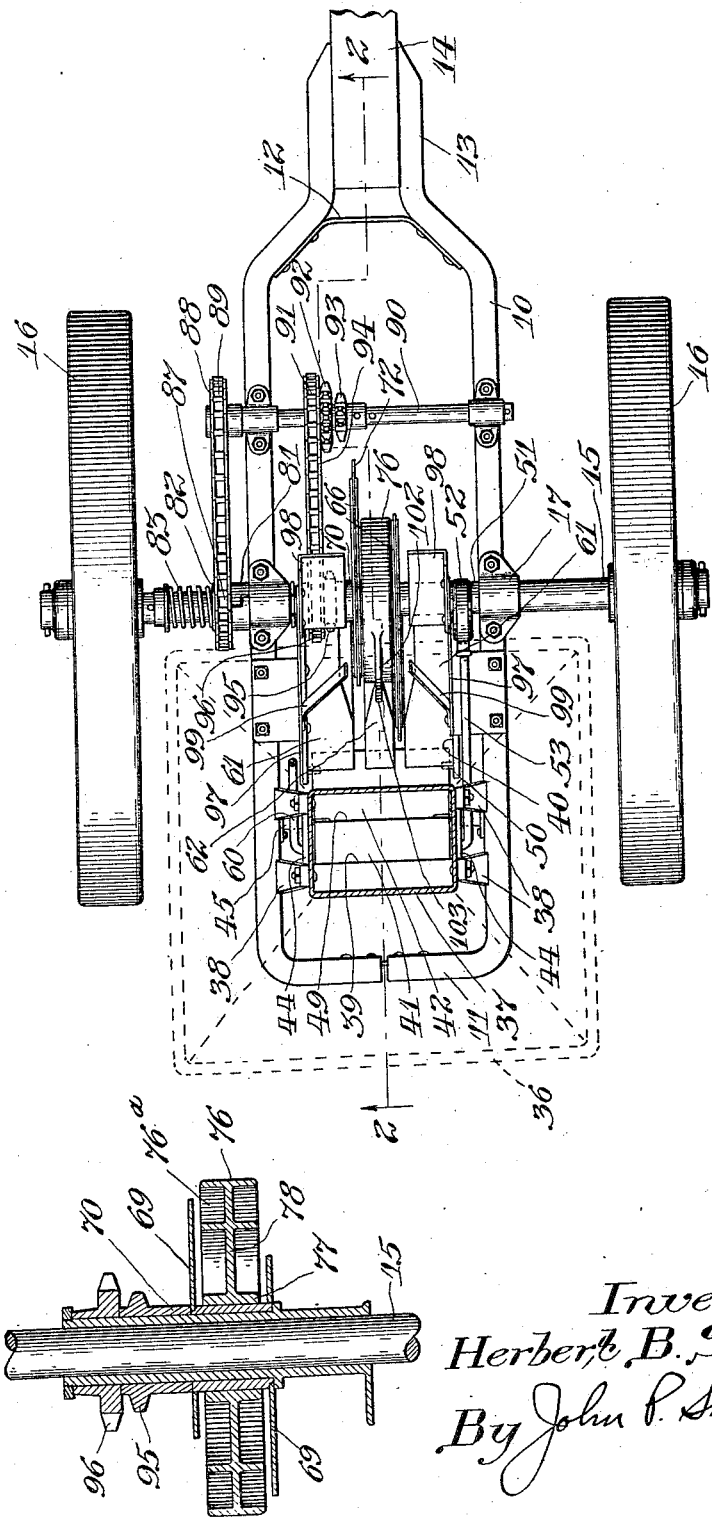

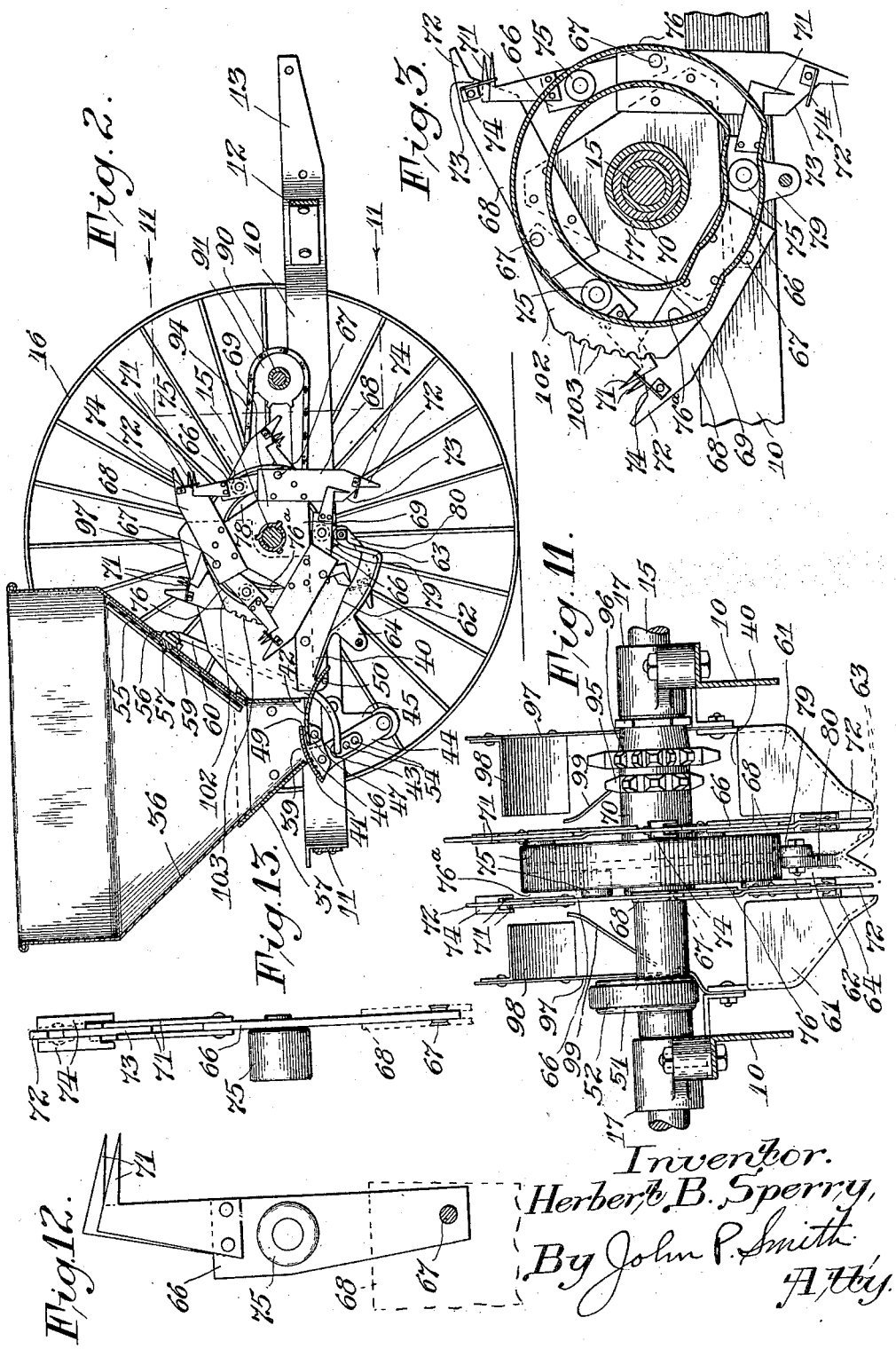

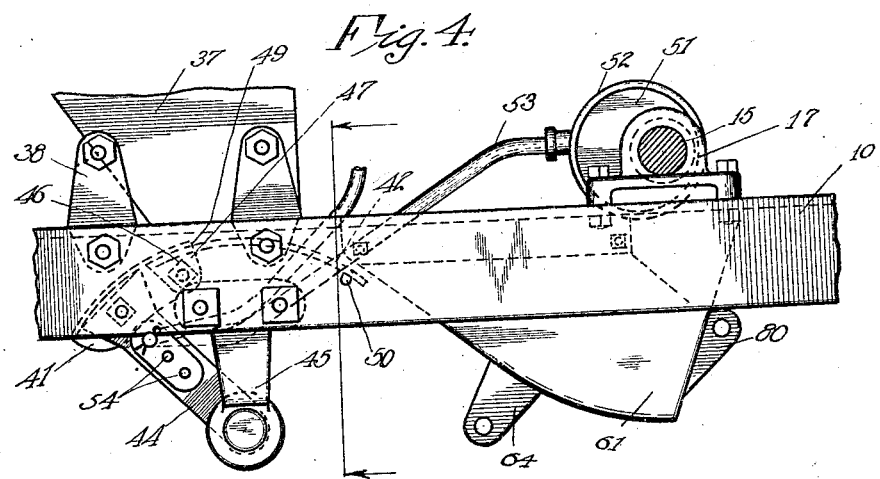
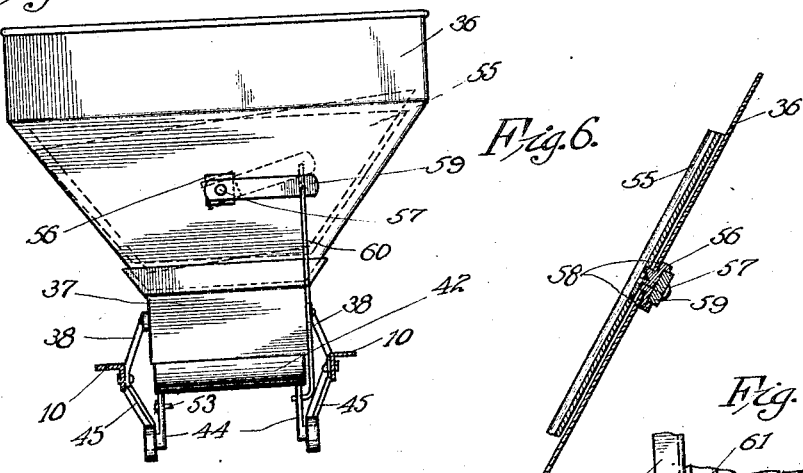
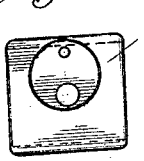
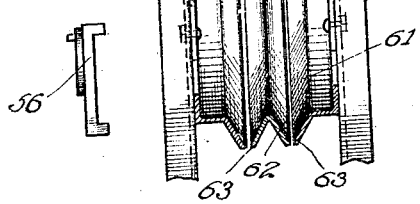

UNITED STATES PATENT OFFICE.

HERBERT B. SPERRY, OF CHICAGO, ILLINOIS, ASSIGNOR TO INTERNATIONAL HARVESTER COMPANY, A CORPORATION OF NEW JERSEY.

DISPENSING MECHANISM FOR POTATO PLANTERS.

1,410,843.    Specification of Letters Patent.    Patented Mar. 28, 1922.

Application filed December 1, 1919. Serial No. 341,755.

*To all whom it may concern:*

Be it known that I, HERBERT B. SPERRY, a citizen of the United States, residing at Chicago, in the county of Cook and State of Illinois, have invented certain new and useful Improvements in Dispensing Mechanism for Potato Planters, of which the following is a full, clear, and exact specification.

This invention relates to a planting mechanism and more particularly to machines for planting potatoes.

The main difficulty experienced with machines which have heretofore been devised for this purpose is that the seed dispensing mechanism is not reliable and does not deposit the potatoes in regular sequence, and at definite intervals.

The present invention has for its object, therefore, to overcome the defects of planting machines and to insure the regular and accurate planting of potatoes at definite intervals.

A further object is to provide improved mechanism in a machine in the class described for insuring a regular feeding of the potatoes from the hopper to the planting mechanism, and to also provide means for positively engaging, conveying and discharging the potatoes in such a manner that they will be accurately planted.

With these and further objects in view, which will appear as the description proceeds, the invention consists briefly of a potato planting machine having a hopper, continuously operated mechanism for feeding the potatoes from the hopper to the planting mechanism, means for agitating the potatoes in the hopper, thereby insuring their being fed from the hopper and planting mechanism of the picker type, and comprising means for impaling or piercing potatoes, carrying them to a position over the furrow made by the furrow openers, and means for withdrawing the impaling means from the potato, thereby insuring their release from the feeding mechanism.

I have illustrated one embodiment of my improved planter in the accompanying drawings, and in these drawings Fig. 1 is a top plan view of a planter embodying the invention;

Fig. 2 is a longitudinal sectional view taken substantially on the line 2—2 of Fig. 1;

Fig. 3 is an enlarged detail view showing the cam drive for the picker fingers.

Fig. 4 is an enlarged detail view illustrating the drive for the hopper feeding mechanism;

Fig. 5 is a rear elevation view, partly in section, showing the driving connections for the agitator in the hopper;

Fig. 6 is an enlarged sectional view illustrating in detail the construction of the hopper agitator;

Figs. 7 and 8 illustrate in plan and elevation the pivotal mounting for the hopper agitator;

Fig. 9 is an enlarged detail view partially in section, illustrating the construction of the chamber or bowl into which the potatoes are fed from the hopper;

Fig. 10 is a detailed sectional view showing the mounting of the feeding mechanism and the cam controlling means on the main axle;

Fig. 11 is a detail view in elevation of the mechanism shown in Fig. 2, taken substantially on line 11—11 of Fig. 2 and looking in the direction of the arrows.

Fig. 12 is an enlarged side view of one of the pickers; and

Fig. 13 is an edge view of the same with cooperating parts indicated in dotted lines.

The potato planter, in connection with which my invention is illustrated, comprises a substantially U-shaped frame having side members 10, a transverse connecting member 11 at the rear ends thereof and a transverse connecting member 12 which is suitably secured to the front ends of the side members. Members 10 are extended forwardly in parallel relation to each other, as shown at 13, and these forwardly extending portions have secured thereto a tongue 14 of any suitable construction. The frame of the planter is supported intermediate its ends on an axle 15, which in turn is supported by transporting wheels 16. As illustrated in Fig. 2, the axle is mounted in bearings 17 suitably secured to the frame members 10.

The potatoes are carried at the rear end of the frame 10 in a hopper 36 which is suitably secured to a chute or throat member 37, the member 37 being rigidly mounted in brackets 38 which in turn are secured to the frame members 10 of the planter. The chute or throat 37 is open at the bottom as shown at 39 (Fig. 2), and means is provided adjacent this opening for feeding the potatoes forwardly into a feeding bowl or chamber 40.

The mechanism for feeding the potatoes from the hopper to the chamber 40 will next be described, and attention is directed particularly to Figs. 2 and 4.

This feeding mechanism comprises a pair of overlapping hinged plates 41 and 42, these plates being hingedly connected by a pivot pin 43. The rear plate 41 is rigidly bolted at its rear end to a pair of arms 44 which are pivoted at their lower ends in brackets 45 carried by the side frame members 10 of the planter. The plate 41 is provided at its front end with downwardly extending lugs 46 which are connected by the pivot pin 43 with lugs 47 formed on the rear end of the plate 42. As clearly shown in Fig. 2, the plate 41 extends over the rear end of the plate 42, thereby forming a shoulder 49 which is adapted to engage and feed the potatoes. The front end of the plate 42 is supported by a pair of lugs 50 carried by the side members of the chamber 40. The arms 44 are driven from the main axle 15 by means of an eccentric 51 which engages an eccentric ring 52 carried by the front end of a link 53, the rear end of the link 53 being bent laterally and engaging one of the arms 44. In order to provide for a variable drive a plurality of apertures 54 is formed in the arm 44 and the end of the link 53 is adapted to engage in one of these apertures.

In addition to the feeding means disposed at the outlet opening of the hopper, means is also provided for agitating the potatoes in the hopper, this means comprising plate 55 which is secured to a casting 56 by a bolt 57, the casting 56 being journaled as illustrated in Fig. 6, on the front wall of the hopper. Casting 56 is also provided with laterally extending flanges 58 between which is mounted an arm 59. The arm 59 has connected thereto at its free end one end of a link 60, the opposite end of the link being pivoted to the arm 44 opposite arm 45 to which the link 53 is connected.

Having described the means for agitating and for feeding potatoes from the hopper to the bowl or chamber 40, I will next describe the construction of this bowl, and will then describe the means for feeding the potatoes from the chamber 40 to their discharging position.

The chamber 40 is disposed immediately in front of and below the hopper and is adapted to receive the potatoes from the feed plate 42, and this chamber comprises three members, namely two side members and a central member. The side members 61 are secured to the side frame members 10 of the planter and are beveled on their inner edges. The central member 62 is disposed between these side members and is provided with two beveled edges 63 which are adapted to form with the beveled edges of the side members a pair of V-shaped grooves which are adapted to receive potatoes from the feeding plate 42. The side members 61 are spaced slightly from but are secured to the central member 62 by means of rearwardly extending lugs 64 formed on the side members, these lugs being secured to corresponding lugs formed on the central member 62. From this description it will be seen that the chamber or bowl 40 is provided with two V-shaped grooves, the members forming these grooves being slightly spaced apart and being rigidly connected to each other and to the frame of the planter.

The means for feeding the potatoes from the chamber or bowl 40 will next be described.

This feeding means comprises a plurality of fingers 66 which are pivoted at their rear ends, as shown at 67, to a series of plates 68, the plates 68 being rigidly secured to substantially triangular plates 69 which in turn are secured to a sleeve 70 which turns on a bushing on axle 15. Each of the fingers 66 has secured thereto adjacent its free ends a pair of spikes or teeth 71, these spikes being secured on the opposite sides to the fingers, and thereby being spaced from each other as shown in Fig. 13. As clearly illustrated in Fig. 3, each of the members 68 has a cutaway portion at one end, thereby forming an outwardly projecting finger 72 and an inclined end portion 73. The portion 73 and finger 72 are disposed between the spike members 71 and are adapted to cooperate with these members to guide the potatoes in a position to be engaged by the spike members and to provide an engaging surface for releasing the potatoes from the spiked teeth when the teeth are withdrawn. Each of the fingers 72 has also secured thereto a pair of outwardly projecting lugs 74, these lugs cooperating to force away any potatoes in addition to the one which has been impaled on the spikes, and also assisting in discharging the potato from the spike. Each of the fingers 66 has secured thereto intermediate its ends a roller 75 which is engaged by a cam 76 having oppositely facing annular tracks 76ᵃ in which the rollers 75 travel in a manner to force the spikes into the potatoes and to withdraw the spikes therefrom.

In the embodiment of the invention illustrated, two sets of picker fingers controlled by the opposite cam tracks 76ᵃ are shown, each of the sets of picker fingers comprising three fingers and the fingers of the two sets being equally spaced around the main axle in alternating relation as shown in Fig. 2.

In describing the construction, one set of fingers and the cam operating means for this set will be described, the other set being exactly similar and operating in the same manner.

As illustrated in Fig. 10, the cam member 76 is preferably formed integral with a central bearing member 77, the cam tracks facing outwardly from a central web 78 also preferably formed integral with the bearing member. Each of the rollers 75 carried by the picker fingers is disposed in a cam track, and as these fingers are pivoted at their rear ends, as shown at 67, the movement of the roller in the cam track will control the movement of the spike members 71 which are carried at the free ends of the picker fingers. The cam tracks are designed with a portion shaped to swing the fingers 66 in a manner to force the spike members or teeth into the potatoes as these members pass through the grooves or channels formed in the bowl or chamber 40, and to withdraw these spike members from the potatoes when the pickers reach dropping position as shown in Figures 2 and 3. The fingers 72 formed on the ends of the members 68 extend through the spaces formed between the members 61 and 62 of the chamber 40 and support the potatoes in a position to be pierced by the spike members 71. The lugs 74 also assist in positioning the potatoes in the chamber and in addition to this engage any surplus potatoes and prevent their being carried over the picker fingers. The central bearing member 77 of the controlling cams is loosely mounted on the sleeve 70 above described, and is prevented from rotation by means of a downwardly extending lug 79 formed on the cam member and secured to a lug 80 which is carried by the central frame member 62 of the chamber 40.

The driving connection for the picker fingers will next be described.

The axle 15 has secured thereto a clutch member 81 which is adapted to be engaged by a spring-pressed reciprocable clutch member 82, this member being normally pressed into engagement with the member 81 by a spring 83. The clutch member 82 has secured thereto, or formed integral therewith a sprocket wheel 87 which is connected by a chain 88 to a sprocket wheel 89 carried by a shaft 90. The shaft 90 has secured thereto a series of sprocket wheels 91, 92 and 93, these sprockets being adapted to be connected by a chain 94 to either one of a pair of sprockets 95 and 96, these last sprockets being secured to the sleeve 70 which carries the plates 69, as above described. As the sleeve 70 is driven by the connections just described, the plates 69 will be rotated, and in view of the fact that the cam tracks 76ª are maintained stationary, the picker fingers will be operated to engage and discharge the potatoes.

A pair of shields 97 is provided, these shields being secured respectively to the side frame members 10 of the planter in a position above the chamber 40 and at one side of the feeding mechanism. The shields 97 have secured thereto a pair of inwardly projecting plates 98, these plates being provided for the purpose of preventing surplus potatoes from being carried over by the feeding mechanism. Additional means for preventing the carrying over of potatoes is provided in resilient inwardly extending fingers 99 which are also secured to the plates 97 in the rear of the plates 98.

It was found in practice that surplus potatoes were carried around on the smooth periphery formed by the cam ring 76 and in order to prevent this, the casting having the cam tracks formed integral therewith, is provided with an upwardly and rearwardly extending web 102, this web being notched or serrated on its outer edge, as shown at 103. It will be readily seen that this serrated web construction will tend to dislodge any surplus potatoes preventing them from being carried over, these potatoes dropping into the chamber or bowl 40.

Having described the construction of my improved planter, I will now briefly outline the operation of the same:

In operation the potatoes will be fed from the hopper 36 and from the throat 37 of the hopper by means of the oscillating feeding plates 41—42, these plates being operated by the link connection 53 and eccentric drive 51—52 from the shaft 15. Oscillation of the crank arms 44 will also set in operation agitating plate 55, this plate being oscillated by the link connection 60. As the potatoes are fed forwardly by the plates 41—42 they are forced into the bowl or chamber 40, certain of the potatoes being disposed in each of the grooves formed between the members 61 and 62. When disposed in these grooves, they will be engaged by the fingers 72 and moved upwardly, and as they are positioned by these fingers they will be impaled on the teeth or spike members 71, the cam tracks 76 controlling the fingers 66 in such a manner that the spike members will be forced into the potatoes. Any surplus potatoes will be pushed to one side by the lug 74, and if they are carried upwardly, will be disengaged or forced downwardly by the fingers 99 and by the shield plate 98. The rearwardly extending web 102 with its roughened edge 103 also serves to prevent any potatoes from being carried over on the outer periphery of the cam. As the potatoes reach a predetermined position above the ground, the cam tracks control the fingers 66 in such a manner that the spike member 71 will be withdrawn from the potatoes, the potatoes being held by the fingers 72, lug 74 and portion 73 of the member 68.

From the above description, it will be seen that a practical and efficient construction has been provided for positively feeding the potatoes from the hopper, engaging the potatoes after they have been fed from the hopper, conveying them to a predetermined position and positively discharging them from the feeding mechanism.

While I have in the above specification described one practical embodiment of my invention, it should be understood that the invention is capable of modification, and that modifications and changes in the construction and arrangement of the cooperating parts may be made without departing from the spirit and scope of the invention, as expressed in the following claims:

1. In a planter, a hopper having a discharge opening therein, reciprocable feeding mechanism disposed adjacent said opening, and including a plurality of plates, certain of said plates overlapping certain others of said plates, and means for reciprocating said plates.

2. In a planter, a hopper having a discharge opening therein, reciprocable feeding mechanism disposed below said discharge opening and including a pair of plates hinged to each other, the rear plate overlapping the front plate and forming a shoulder by means of which material in said hopper is fed, and means for reciprocating said plates.

3. In a planter, a hopper having a discharge opening therein, reciprocable feeding mechanism disposed below said opening and including a pair of plates hinged to each other, one of said plates overlapping the other of said plates, means connected to one of said plates for reciprocating said plates, and means for supporting the other of said plates as it is being reciprocated.

4. In a planter, a frame, a hopper carried thereby and having a discharge opening, reciprocable feeding mechanism including a plurality of upwardly curved plates having overlapping edges disposed below said opening, operating mechanism connected to one of said plates, and means carried by the frame for supporting the other of said plates as said plates are reciprocated.

5. In a planter, a frame, a hopper carried thereby and having a discharge opening, feeding mechanism disposed below said opening and including a pair of plates disposed, one in front of the other, means connected to one of said plates for reciprocating said plates, means for pivotally connecting said plates, and means carried by the frame for supporting the front plate as said plates are reciprocated.

6. In a potato planter, feeding mechanism including a rotatable member, fingers movably carried thereby, teeth carried by said fingers, and means carried by said rotatable members and positioned in advance of said fingers for engaging and removing from the path of movement of said fingers surplus potatoes.

7. In a potato planter, feeding mechanism including a rotatable member, fingers pivotally mounted thereon, teeth carried by said fingers, actuating means for said fingers, means carried by said rotatable member for engaging and positioning the potatoes as they are being impaled on said teeth, including means positioned in advance of said fingers for engaging and removing from the path of movement of said fingers surplus potatoes.

8. In a potato planter, feeding mechanism including a rotatable member, fingers pivotally mounted thereon, teeth carried by said fingers, actuating means for said fingers, and plates carried by said rotatable member and formed with cut away ends positioned between said teeth for positioning the potatoes as they are being impaled on said teeth and for discharging the potatoes from said teeth as said teeth are withdrawn.

9. In a potato planter, feeding mechanism including a rotatable member, fingers pivotally mounted thereon, spaced teeth carried by said fingers and projecting outwardly therefrom, outwardly projecting members rigidly mounted on said rotatable member and having end portions cut away to provide an inclined edge and projecting finger disposed between said teeth for positioning the potatoes as they are being impaled on said teeth, and discharging the potatoes from said teeth, and means for positively controlling said fingers in a manner to force said teeth toward or away from the potato positioning means carried by said rotatable member.

10. In a potato planter, feeding mechanism including a rotatable member, fingers pivoted thereto, teeth carried by said fingers and outwardly projecting lugs carried by said rotatable member for discharging surplus potatoes from the path of movement of said rotatable member and said fingers.

11. In a potato planter, feeding mechanism including a rotatable member, fingers pivotally mounted on said rotatable member and having potato engaging means thereon, cam controlling means for said fingers and means carried by said cam controlling means for discharging the surplus potatoes therefrom, thereby preventing said surplus potatoes from being carried over by said rotatable member and said fingers.

12. In a potato planter, feeding mechanism including a rotatable member, fingers pivotally mounted on said rotatable member and having potato engaging means thereon, cam controlling means for said fingers and serrated means carried by said cam controlling means for discharging the surplus potatoes therefrom, thereby preventing said surplus potatoes from being carried over by said rototable member and said fingers.

13. In a potato planter, a receptacle having a longitudinal opening and a parallel longitudinal groove therein, feeding mechanism including a rotatable member, means carried by said rotatable member and disposed in a position to pass through said opening and longitudinally of said groove for positioning potatoes and means carried by said rotatable member for engaging the potatoes so positioned.

14. In a potato planter, a receptacle having a plurality of V-shaped longitudinal grooves therein, feeding mechanism including a rotatable member, fingers pivoted thereto and disposed in a position to pass through said grooves, and means for positively actuating said fingers in a direction to engage the potatoes disposed in said grooves.

15. In a potato planter, a receptacle having a plurality of longitudinally disposed V-shaped grooves therein, a longitudinal opening positioned at the lowest point of each of said grooves, feeding mechanism including a rotatable member, potato positioning means adapted to pass through said longitudinal openings and potato engaging fingers pivoted to said rotatable member and disposed adjacent said potato positioning means, and means for positively actuating said pivoted fingers in a direction to engage the potatoes disposed in said grooves.

16. In a potato planter, a receptacle having a plurality of longitudinally disposed, arcuate V-shaped grooves therein, feeding mechanism comprising a rotatable member, fingers pivoted thereto, outwardly projecting teeth carried by said fingers and disposed in a position to pass through said grooves, and means for forcing said teeth outwardly into said grooves to engage the potatoes positioned therein.

In testimony whereof I affix my signature.

HERBERT B. SPERRY.